United States Patent
Lang et al.

(10) Patent No.: US 7,790,665 B2
(45) Date of Patent: Sep. 7, 2010

(54) HIGHLY CONCENTRATED, AQUEOUS OLIGOESTER AND POLYESTER FORMULATIONS

(75) Inventors: Frank-Peter Lang, Hattersheim (DE); Michael Weβling, Kandern (DE)

(73) Assignee: Clariant Produkte (Deutschland) GmbH, Frankfurt (DE)

( * ) Notice: Subject to any disclaimer, the term of this patent is extended or adjusted under 35 U.S.C. 154(b) by 690 days.

(21) Appl. No.: 11/629,104

(22) PCT Filed: Jun. 14, 2005

(86) PCT No.: PCT/EP2005/006344

§ 371 (c)(1),
(2), (4) Date: Jul. 24, 2007

(87) PCT Pub. No.: WO2005/123835

PCT Pub. Date: Dec. 29, 2005

(65) Prior Publication Data

US 2008/0139442 A1    Jun. 12, 2008

(30) Foreign Application Priority Data

Jun. 17, 2004    (DE) .................. 10 2004 029 310

(51) Int. Cl.
C11D 3/37    (2006.01)
C11D 1/04    (2006.01)
C11D 1/722   (2006.01)
C08G 63/668  (2006.01)

(52) U.S. Cl. .............. 510/361; 510/434; 510/476; 510/477; 510/488; 510/533

(58) Field of Classification Search ........... 510/361, 510/434, 476, 477, 488, 533
See application file for complete search history.

(56) References Cited

U.S. PATENT DOCUMENTS

| | | | |
|---|---|---|---|
| 3,128,287 A | 4/1964 | Bera | |
| 3,159,581 A | 12/1964 | Diehl | |
| 3,213,030 A | 10/1965 | Diehl | |
| 3,332,880 A | 7/1967 | Kessler | |
| 3,400,148 A | 9/1968 | Quimby | |
| 3,422,021 A | 1/1969 | Roy | |
| 3,422,131 A | 1/1969 | Quimby | |
| 3,586,715 A | 6/1971 | Smeets | |
| 3,635,830 A | 1/1972 | Lamberti | |
| 3,712,873 A | 1/1973 | Zenk | |
| 3,835,163 A | 9/1974 | Rapko | |
| 3,923,679 A | 12/1975 | Rapko | |
| 3,936,537 A | 2/1976 | Baskerville, Jr. | |
| 3,959,230 A | 5/1976 | Hays | |
| 3,985,669 A | 10/1976 | Krummel | |
| 4,102,903 A | 7/1978 | Crutchfield | |
| 4,116,885 A | 9/1978 | Derstadt | |
| 4,120,874 A | 10/1978 | Crutchfield | |
| 4,158,635 A | 6/1979 | Crutchfield | |
| 4,374,035 A | 2/1983 | Bossu | |
| 4,412,934 A | 11/1983 | Chung | |
| 4,427,557 A | 1/1984 | Stockburger | |
| 4,536,314 A | 8/1985 | Hardy | |
| 4,539,130 A | 9/1985 | Thompson | |
| 4,566,984 A | 1/1986 | Bush | |
| 4,569,772 A | 2/1986 | Ciallella | |
| 4,605,509 A | 8/1986 | Corkill | |
| 4,606,838 A | 8/1986 | Burns | |
| 4,634,551 A | 1/1987 | Burns | |
| 4,663,071 A | 5/1987 | Bush | |
| 4,664,839 A | 5/1987 | Rieck | |
| 4,671,891 A | 6/1987 | Hartman | |
| 4,681,592 A | 7/1987 | Hardy | |
| 4,681,695 A | 7/1987 | Divo | |
| 4,686,063 A | 8/1987 | Burns | |
| 4,721,580 A * | 1/1988 | Gosselink | 510/297 |
| 4,795,584 A | 1/1989 | Ross | |
| 4,968,451 A | 11/1990 | Scheibel | |
| 5,142,020 A | 8/1992 | Kud | |
| 5,374,370 A | 12/1994 | Brown | |
| 5,415,807 A | 5/1995 | Gosselink | |
| 5,562,283 A | 7/1997 | Boeck | |
| 5,691,298 A | 11/1997 | Gosselink | |
| 5,700,386 A | 12/1997 | Chapman | |
| 5,777,046 A | 7/1998 | Boeckh | |
| 5,798,366 A | 8/1998 | Blokzinl | |
| 5,843,878 A | 12/1998 | Gosselink | |
| 5,912,385 A | 6/1999 | Kushibe | |
| 2007/0131144 A1 | 6/2007 | Winter et al. | |

FOREIGN PATENT DOCUMENTS

DE    19522431    2/1996
EP    707627    4/1996

OTHER PUBLICATIONS

International Search Report PCT/EP 2005/006344, mailed Aug. 16, 2005.
English Language Abstract for DE19522431, Feb. 15, 1996.
English Language Translation of International Preliminary Report on Patentability for Corres. Case PCT/EP2005/006344, filed Jun. 14, 2005.
Co-pending U.S. Appl. No. 11/665,949, by Fechner et al., filed Apr. 20, 2007.

* cited by examiner

*Primary Examiner*—Brian P Mruk
(74) *Attorney, Agent, or Firm*—Tod A. Waldrop

(57) ABSTRACT

Disclosed are highly concentrated aqueous soil release polyester formulations containing 50 to 90 percent by weight of soil release polyester and 0.1 to 40 percent by weight of a polycarboxylic acid or a polycarboxylate. Adding these highly concentrated polycarboxylic acids or polycarboxylates makes it possible to produce highly concentrated soil release polyester formulations which are stable while being provided with low viscosity.

28 Claims, No Drawings

HIGHLY CONCENTRATED, AQUEOUS OLIGOESTER AND POLYESTER FORMULATIONS

The invention relates to aqueous, highly concentrated, free-flowing and storage-stable formulations of oligo- and polyesters and to their use in washing and cleaning compositions, in the textile industry and in cosmetics.

Water-soluble or water-dispersible polyesters have been known for some time. They are used in textile finishing for hydrophilization, for improving the transport of moisture, for improving the washout of hydrophobic stains, for example fats and oils, and for improving the antistatic properties of polyester fabrics.

Also known is their use as soil release polymers in washing and cleaning compositions for textiles. Here too, they serve to improve the detachment of soil from synthetic fibers, especially from polyester and polyester blend fabrics.

Also known is the use of certain water-soluble oligo- and polyesters in cosmetic formulations such as skin creams or shower gels, in which they serve to improve the skin feel (skin conditioners).

These water-soluble or water-dispersible polyesters are polycondensates based on dicarboxylic acids and reactants which have two or more hydroxyl groups. The dicarboxylic acid used is typically terephthalic acid. In addition to this, further di- or polybasic carboxylic acids, for example isophthalic acid, may be present. The reactants with several hydroxyl groups (polyols) used are, for example, ethylene glycol, propylene glycol, butylene glycol, their dimers, trimers, oligomers or polymers. It is also possible for components which have three or more hydroxyl groups to be present, for example glycerol or pentaerythritol. Monofunctional reactants, for example methylpolyethylene glycols, are used as end caps to control the molecular weight of the polyesters.

For use of the polyesters as soil release polymers in liquid washing and cleaning compositions, they are supplied in undiluted form, as pasty or waxy products, or in the form of aqueous formulations.

The undiluted products have the disadvantage that they first have to be melted so that they can then be metered in liquid, castable or pumpable form to a liquid washing or cleaning composition formulation.

For this purpose, though, heatable storage vessels and pipelines have to be provided, which constitutes a not inconsiderable level of technical complexity.

The commercially available aqueous formulations in turn have the disadvantage that they are producible only with relatively low active substance contents. It is a further disadvantage of all aqueous polyester formulations that they have only very restricted physical storage stability. For example, clear formulations, especially at elevated storage temperature, become opaque even after a short time, and a solid can then precipitate out. Aqueous dispersions tend to phase separation, the polymer particles dispersed in water sedimenting slowly.

It is an object of the present invention to provide a highly concentrated, aqueous formulation of oligo- and polyesters which has good physical stability and low viscosity and is thus simple to store and to process by the user.

It has now been found that, surprisingly, this aim can be achieved by the addition of a polycarboxylic acid or of a polycarboxylate.

The invention provides highly concentrated, aqueous formulations of oligo- and polyesters which essentially comprise from 30 to 90% by weight of a soil release polyester and from 0.1 to 40% by weight of a polycarboxylic acid or polycarboxylate.

The water-soluble or water-dispersible oligo- or polyesters for the highly concentrated, aqueous formulations may be nonionic or anionic.

Nonionic oligo- and polyesters are described, for example, in the following patents: U.S. Pat. Nos. 3,712,873, 3,959,230, 4,116,885, EP 0 442 101, DE 44 03 866, EP 253 567, EP 357 280 and DE 195 22 431.

Nonionic oligo- and polyesters may be based on the following monomers: Dihydric alcohols (glycols), especially ethylene glycol; 1,2-propylene glycol; 1,3-propylene glycol; 1,2-butylene glycol; 2,3-butylene glycol; 1,4-butylene glycol; pentanediols; 3-methoxy-1,2-propylene glycol.

Polyhydric alcohols, especially glycerol, pentaerythritol, oligoglycerols and their alkoxylated conversion products.

Addition products of from 1 to 5 mol of ethylene oxide and/or propylene oxide to 1 mol of the abovementioned at least dihydric alcohols, for example ethylene diglycol, propylene diglycol, addition products of from 1 to 3 mol of ethylene oxide and/or propylene oxide to 1 mol of glycerol, addition products of from 1 to 4 mol of ethylene oxide and/or propylene oxide to pentaerythritol.

Polyalkylene glycols. These derive preferably from ethylene oxide, propylene oxide, n-butylene oxide or isobutylene oxide. They may be homopolymers, copolymers or terpolymers of the alkylene oxides mentioned. The copolymers may be block copolymers, random copolymers or alternating copolymers. Preference is given to using polyethylene glycol, polypropylene glycol or their block copolymers.

Alkylene oxide addition products, especially water-soluble addition products, of from 5 to 80 mol of alkylene oxide(s) to 1 mol of $C_8$- to $C_{24}$-alcohols, $C_6$- to $C_{18}$-alkylphenols or $C_8$- to $C_{24}$-alkylamines. Preferred alkylene oxides are ethylene oxide, propylene oxide, butylene oxide and mixtures thereof.

Aliphatic dicarboxylic acids. Suitable aliphatic dicarboxylic acids contain, for example, from 2 to 10 carbon atoms. Examples thereof are oxalic acid, malonic acid, succinic acid, glutaric acid, adipic acid, maleic acid, fumaric acid, itaconic acid and citraconic acid. They may be used individually or in a mixture. Mixtures with the aromatic dicarboxylic acids mentioned below are also possible.

Aromatic dicarboxylic acids, especially terephthalic acid, isophthalic acid, phthalic acid.

Monohydroxymonocarboxylic acids, especially glycolic acid, lactic acid, ω-hydroxystearic acid and ω-hydroxycaproic acid.

Monocarboxylic acids, for example benzoic acid, may likewise be used as monofunctional reactants for controlling the molecular weight.

Esters and anhydrides. The aforementioned carboxylic acids may also be used in the form of their esters or, if available, their anhydrides. Examples thereof are dimethyl terephthalate, diethyl terephthalate, diethyl oxalate, dimethyl adipate, phthalic anhydride, maleic anhydride, succinic anhydride.

Anionic oligo- and polyesters are described, for example, in U.S. Pat. Nos. 4,427,557; 4,721,580; 5,691,298; 5,700,386; 5,843,878; WO 96/18715; WO 95/02028; WO 95/02029 and EP 707627.

To prepare anionic oligo- and polyesters, as well as the aforementioned components used for the preparation of nonionic polyesters, additionally, for example, hydroxyethanesulfonic acid, hydroxypropanesulfonic acid, their reaction products with alkylene oxides, preferably with ethylene oxide and/or propylene oxide, glyceryl sulfoethyl ether, glyceryl sulfopropyl ether, sulfoisophthalic acid and sulfobenzoic acid are copolymerized.

Oligo- and polyesters which can be used in accordance with the invention preferably have the following structure:

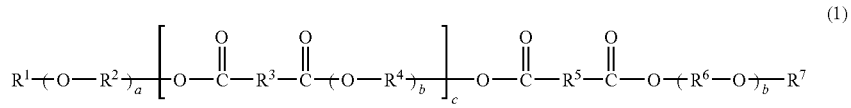

in which
R¹ and R⁷ are each linear or branched $C_1$-$C_{18}$ alkyl
R², R⁴, R⁶ are each independently alkylene, e.g. ethylene, propylene, butylene and/or cycloalkylene, e.g. 1,4-cyclohexylene or 1,4-dimethylenecyclohexylene, and mixtures thereof
R³ and R⁵ are each arylene or alkarylene, e.g. 1,4-phenylene, 1,3-phenylene, 1,2-phenylene, 1,8-naphthylene, 1,4-naphthylene, 2,2'-biphenylene, 4,4'-biphenylene and mixtures thereof, and/or alkylene or alkenylene, for example methylene, ethylene, propylene, butylene, pentylene, hexylene and mixtures thereof
a, b and d are each from 1 to 200
c is from 1 to 20.

Preference is given to oligo- and polyesters of the formula (1) in which
R¹ and R⁷ are each methyl and/or ethyl,
R², R⁴, R⁶ are each ethylene, 1,2-propylene or mixtures thereof
R³ and R⁵ are each 1,4-phenylene and 1,3-phenylene and
a, b and d are from 1 to 100
c is from 1 to 10.

Preferred oligo- and polyesters are also those of the formula (2)

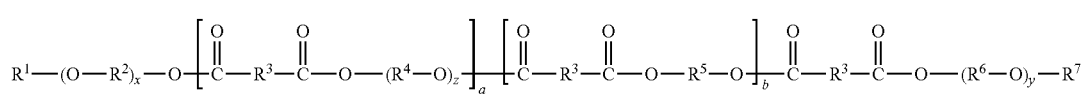

in which
R¹ and R⁷ are each linear or branched $C_1$-$C_{18}$-alkyl, R² and R⁶ are each ethylene, R³ is 1,4-phenylene, 1,3-phenylene, R⁴ is ethylene, R⁵ is ethylene, 1,2-propylene or random mixtures of any composition of the two, x and y are each independently from 1 to 500, z is from 10 to 140, a is from 1 to 12, b is from 7 to 40, where a+b is at least equal to 11.

Preferably, each independently, in the formula (2)
R¹ and R⁷ are each linear or branched $C_1$-$C_4$-alkyl, x and y are from 3 to 45, z is from 18 to 70, a is from 2 to 5, b is from 8 to 12, a+b is from 12 to 18 or from 25 to 35.

In addition to the oligo- and polyesters, the inventive formulations comprise polycarboxylic acids or polycarboxylates. Useful polycarboxylic acids or polycarboxylates are, for example, compounds of the formula (3)

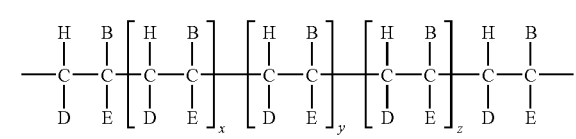

in which B is hydrogen, $C_1$-$C_4$-alkyl, especially methyl, ethyl, propyl, —COOM, —CH₂—COOM, D is hydrogen, $C_1$-$C_4$-alkyl, especially methyl or —COOM, E is hydrogen, $C_1$-$C_4$-alkyl, especially methyl, ethyl; cycloalkyl, especially cyclohexyl; aryl, especially phenyl, —COOM, —CH₂—COOM, $C_1$-$C_4$-acyl, especially acetyl; —OH, $C_1$-$C_4$-alkoxy, especially —OCH₃; halogen, especially chlorine, or —CN, x is from 0 to 3500, y is from 0 to 3500, z is from 0 to 3500, M is hydrogen, sodium, potassium, lithium, ammonium or substituted ammonium, where at least one index x, y or z is greater than zero. The substituents B, D and E may be the same or different.

The following monomers may, for example, be present in the polycarboxylic acids, or polycarboxylates of the formula (3):

acrylic acid, methacrylic acid, maleic acid, fumaric acid, itaconic acid, citraconic acid, mesaconic acid, aconitic acid, methylenemalonic acid.

These may also be present partly in the form of their esters, for example esterified with methanol, ethanol or propanol.

In addition, for example, the following carboxyl-free comonomers may be present: olefins, preferably ethylene, propylene and butylene, vinyl acetate, vinyl alcohol, styrene, vinyl methyl ether, vinylcyclohexane, vinyl chloride, acrylonitrile, vinylimidazoline, vinylpyrrolidone.

The polycarboxylic acids of the general formula (3) may be homopolymers, copolymers and terpolymers.

Homopolymers are especially polyacrylic acids having a molar mass of up to 250 000, preferably from 2000 to 100 000, and polymaleic acid. Polycarboxylic acids which are formed from two or more monomers may be random copolymers, block copolymers, alternating copolymers or graft copolymers.

Copolymers contain, for example, two carboxyl-containing monomers and optionally further comonomers. They may also contain, in polymerized form, only one carboxyl-containing monomer together with other vinylic monomers.

Particular preference is given to copolymers based on acrylic acid and maleic acid, maleic acid and olefins (especially ethylene), maleic acid and vinyl methyl ether, acrylic acid and olefins (especially ethylene), and acrylic acid and vinyl methyl ether.

According to the invention, ether polycarboxylates are also useful. Ether polycarboxylates are, for example, described in U.S. Pat. Nos. 3,128,287 and 3,635,830. They are oxydisuccinates.

A specific group of ether polycarboxylates which can be used according to the present invention correspond to the general formula (4):

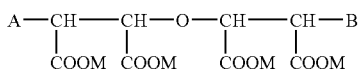
(4)

in which A is H or —OH,

B is H or a group of the formula

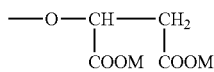

M is H, Li, Na, K, ammonium or substituted ammonium.

Examples of such ether polycarboxylates are, for example: oxydisuccinic acid and salts thereof (A and B=H); tartrate monosuccinic acid and salts thereof (A=—OH and B=H); tartrate disuccinic acid and salts thereof

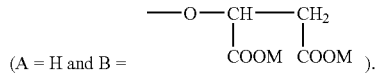

It is also possible to use mixtures of different ether polycarboxylates.

It is also possible to use cyclic ether carboxylates, as described, for example, in U.S. Pat. Nos. 3,923,679; 3,835,163; 4,158,635; 4,120,874 and 4,102,903.

It is additionally possible to use ether hydroxy polycarboxylates of the formula (5).

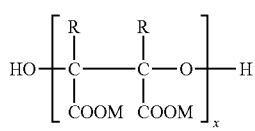
(5)

in which M is H, Li, Na, K, ammonium, substituted ammonium, x is from 2 to 15 and R is hydrogen or $C_1$-$C_4$-alkyl.

The inventive formulations may contain from 30 to 90% by weight, preferably from 50 to 90% by weight, more preferably from 70 to 80% by weight of oligo- or polyesters. The content of polycarboxylic acid or polycarboxylate may be from 0.1 to 40% by weight, preferably from 0.1 to 25% by weight, more preferably from 0.1 to 10% by weight and most preferably from 0.5 to 5% by weight in the inventive formulation.

The inventive highly concentrated, aqueous oligo- and polyester formulations are generally used in washing and cleaning compositions in concentrations of less than 5% by weight, preferably to an extent of less than 1.5% by weight and more preferably to an extent of from 0.5 to 1% by weight (concentration data here based on the polyester fraction in the formulation).

The washing and cleaning compositions in which the inventive aqueous, highly concentrated oligo- and polyester formulations can be used are preferably liquid detergents, wash gels and wash pastes, but also powders, granules, pellets, tablets, bars and blocks.

In liquid detergents, wash gels and wash pastes, these formulations may be processed in a simple manner by means of mechanical homogenization devices such as stirrers.

In solid washing compositions, such as washing powders, these formulations may be applied to the washing powder or to individual pulverulent constituents, for example zeolites, sodium sulfate, soda, by means of spray application, if appropriate in a mixture with other liquid washing composition components.

The washing compositions comprising the highly concentrated poly- or oligoester formulations may be packaged in films which either have a protective function in the course of storage or else serve as a metering aid. The films may be water-soluble.

The highly concentrated, aqueous polyester formulations may also be used in specific laundry treatment compositions, for example stain removers or wash boosters.

Washing and cleaning compositions which comprise the inventive highly concentrated, aqueous oligo- or polyester formulations may additionally comprise further customary constituents. These are described below:

Anionic Surfactants

Useful anionic surfactants include sulfates, sulfonates, carboxylates, phosphates and mixtures thereof. Suitable cations here are alkali metals, for example sodium or potassium, or alkaline earth metals, for example calcium or magnesium, and also ammonium, substituted ammonium compounds, including mono-, di- or triethanolammonium cations and mixtures thereof.

The following types of anionic surfactants are particularly preferred: alkyl ester sulfonates, alkyl sulfates, alkyl ether sulfates, alkylbenzenesulfonates, alkanesulfonates and soaps, as described below.

Alkyl ester sulfonates include linear esters of $C_8$-$C_{20}$-carboxylic acids (e.g. fatty acids) which are sulfonated by means of gaseous $SO_3$, as described in "The Journal of the American Oil Chemists Society" 52 (1975), p. 323-329.

Suitable starting materials are natural fats, such as tallow, coconut oil and palm oil, but may also be of synthetic nature.

Preferred alkyl ester sulfonates, especially for washing composition applications, are compounds of the formula

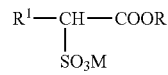

in which $R^1$ is a $C_8$-$C_{20}$-hydrocarbyl radical, preferably alkyl, and R is a $C_1$-$C_6$-hydrocarbyl radical, preferably alkyl. M is a cation which forms a water-soluble salt with the alkyl ester sulfonate. Suitable cations are sodium, potassium, lithium or ammonium cations, such as monoethanolamine, diethanolamine and triethanolamine. Preferably, $R^1$ is $C_{10}$-$C_{16}$-alkyl and R is methyl, ethyl or isopropyl. Most preferred are methyl ester sulfonates in which $R^1$ is $C_{10}$-$C_{16}$-alkyl.

Alkyl sulfates here are water-soluble salts or acids of the formula $ROSO_3M$ in which R is a $C_{10}$-$C_{24}$-hydrocarbyl radical, preferably an alkyl or hydroxyalkyl radical with $C_{10}$-$C_{20}$-alkyl component, more preferably a $C_{12}$-$C_{18}$-alkyl or hydroxyalkyl radical.

M is hydrogen or a cation, for example an alkali metal cation (for example sodium, potassium, lithium), or ammonium or substituted ammonium, for example methyl-, dimethyl- and trimethylammonium cations, or quaternary ammonium cations such as tetramethylammonium and dimethylpiperidinium cations, and quaternary ammonium cations derived from alkylamines such as ethylamine, diethylamine, triethylamine and mixtures thereof.

Alkyl chains with $C_{12}$-$C_{16}$ are preferred for low washing temperatures (e.g. below about 50° C.) and alkyl chains with $C_{16}$-$C_{18}$ are preferred for higher washing temperatures (e.g. above about 50° C.).

Alkyl ether sulfates are water-soluble salts or acids of the formula $RO(A)_m SO_3M$ in which R is an unsubstituted $C_{10}$-$C_{24}$-alkyl or hydroxyalkyl radical, preferably a $C_{12}$-$C_{20}$-alkyl or hydroxyalkyl radical, more preferably a $C_{12}$-$C_{18}$-alkyl or hydroxyalkyl radical.

A is an ethoxy or propoxy unit, m is a number greater than 0, preferably from approx. 0.5 to approx. 6, more preferably from approx. 0.5 to approx. 3, and M is a hydrogen atom or a cation, for example sodium, potassium, lithium, calcium, magnesium, ammonium or a substituted ammonium cation. Specific examples of substituted ammonium cations comprise methyl-, dimethyl-, trimethylammonium and quaternary ammonium cations, such as tetramethylammonium and dimethylpiperidinium cations, and also those which are derived from alkylamines such as ethylamine, diethylamine, triethylamine or mixtures thereof. Examples include $C_{12}$-$C_{18}$ fatty alcohol ether sulfates in which the content of EO is 1, 2, 2.5, 3 or 4 mol per mole of the fatty alcohol ether sulfate and in which M is sodium or potassium.

In secondary alkanesulfonates, the alkyl group may either be saturated or unsaturated, branched or linear, and may optionally be substituted by a hydroxyl group.

The sulfo group may be at any position in the carbon chain, but the primary methyl groups at the start of the chain and at the end of the chain do not have any sulfonate groups.

The preferred secondary alkanesulfonates comprise linear alkyl chains having from approx. 9 to 25 carbon atoms, preferably from approx. 10 to approx. 20 carbon atoms and more preferably from approx. 13 to 17 carbon atoms. The cation is, for example, sodium, potassium, ammonium, mono-, di- or triethanolammonium, calcium or magnesium and mixtures thereof. Sodium is the preferred cation.

In addition to secondary alkanesulfonates, it is also possible to use primary alkanesulfonates in the inventive washing compositions.

The preferred alkyl chains and cations correspond to those of the secondary alkanesulfonates.

The preparation of primary alkanesulfonic acids, from which the corresponding sulfonates effective as surfactants are obtained, is described, for example, in EP 854 136-A1.

Further suitable anionic surfactants are alkenyl- or alkylbenzenesulfonates. The alkenyl or alkyl group may be branched or linear and may optionally be substituted by a hydroxyl group. The preferred alkylbenzenesulfonates comprise linear alkyl chains having from approx. 9 to 25 carbon atoms, preferably from approx. 10 to approx. 13 carbon atoms; the cation is sodium, potassium, ammonium, mono-, di- or triethanolammonium, calcium or magnesium and mixtures thereof.

For mild surfactant systems, magnesium is the preferred cation, while sodium is preferred for standard washing applications. The same applies to alkenylbenzenesulfonates.

The term anionic surfactants also includes olefinsulfonates which are obtained by sulfonation of $C_8$-$C_{24}$-α-olefins, preferably $C_{14}$-$C_{16}$-α-olefins, with sulfur trioxide and subsequent neutralization. As a result of the preparation process, these olefinsulfonates may comprise relatively small amounts of hydroxyalkanesulfonates and alkanedisulfonates. Specific mixtures of α-olefin-sulfonates are described in U.S. Pat. No. 3,332,880.

Further preferred anionic surfactants are carboxylates, for example fatty acid soaps and comparable surfactants. The soaps may be saturated or unsaturated and may comprise various substituents, such as hydroxyl groups or α-sulfonate groups. Preference is given to linear saturated or unsaturated hydrocarbyl radicals as the hydrophobic moiety having from approx. 6 to approx. 30, preferably from approx. 10 to approx. 18, carbon atoms.

Further useful anionic surfactants include salts of acylaminocarboxylic acids; the acyl sarcosinates which are formed by reacting fatty acid chlorides with sodium sarcosinate in an alkaline medium; fatty acid/protein condensation products which are obtained by reacting fatty acid chlorides with oligopeptides; salts of alkylsulfamidocarboxylic acids; salts of alkyl ether carboxylic acids and alkylaryl ether carboxylic acids; sulfonated polycarboxylic acids which are prepared by sulfonation of the pyrolysis products of alkaline earth metal citrates, as described, for example, in GB-1,082,179; alkyl glyceryl sulfates and alkenyl glyceryl sulfates, such as oleyl glyceryl sulfates, alkylphenol ether sulfates, alkyl phosphates, alkyl ether phosphates, isethionates, such as acyl isethionates, N-acyltaurides, alkyl succinates, sulfosuccinates, monoesters of sulfosuccinates (particularly saturated and unsaturated $C_{12}$-$C_{18}$ monoesters) and diesters of sulfosuccinates (particularly saturated and unsaturated $C_{12}$-$C_{18}$ diesters), acyl sarcosinates, sulfates of alkylpolysaccharides, such as sulfates of alkylpolyglycosides, branched primary alkyl sulfates and alkylpolyethoxycarboxylates, such as those of the formula $RO(CH_2CH_2)_kCH_2COO^-M^+$ in which R is $C_8$- to $C_{22}$-alkyl, k is a number from 0 to 10 and M is a cation.

Further examples are described in "Surface Active Agents and Detergents" (Vol. I and II, Schwartz, Perry and Berch).

Nonionic Surfactants

Condensation products of aliphatic alcohols with from approx. 1 to approx. 25 mol of ethylene oxide.

The alkyl chain of the aliphatic alcohols may be linear or branched, primary or secondary, and contains generally from approx. 8 to approx. 22 carbon atoms. Particular preference is given to the condensation products of $C_{10}$-$C_{20}$-alcohols with from approx. 2 to approx. 18 mol of ethylene oxide per mole of alcohol. The alkyl chain may be saturated or else unsaturated. The alcohol ethoxylates may have a narrow homolog distribution ("narrow range ethoxylates") or a broad homolog distribution of the ethylene oxide ("broad range ethoxylates").

Examples of commercially available nonionic surfactants of this type are Tergitol® 5-S-9 (condensation product of a linear secondary $C_{11}$-$C_{15}$-alcohol with 9 mol of ethylene oxide), Tergitol®, 24-L-NMW (condensation product of a linear primary $C_{12}$-$C_{14}$-alcohol with 6 mol of ethylene oxide with narrow molar mass distribution). This product class likewise includes the Genapol® brands of Clariant GmbH.

Condensation products of ethylene oxide with a hydrophobic base, formed by condensation of propylene oxide with propylene glycol.

The hydrophobic moiety of these compounds preferably has a molecular weight from approx. 1500 to approx. 1800. The addition of ethylene oxide onto this hydrophobic moiety leads to an improvement in the water solubility. The product is liquid up to a polyoxyethylene content of approx. 50% of the total weight of the condensation product, which corresponds to a condensation with up to approx. 40 mol of ethylene oxide. Commercially available examples of this product class are, for example, the Pluronic® brands of BASF and the ®Genapol PF brands of Clariant GmbH.

Condensation products of ethylene oxide with a reaction product of propylene oxide and ethylenediamine.

The hydrophobic unit of these compounds consists of the reaction product of ethylenediamine with excess propylene oxide and generally has a molecular weight of from approx. 2500 to 3000. Ethylene oxide is added onto this hydrophobic unit until the product has a content of from approx. 40 to approx. 80% by weight of polyoxyethylene and a molecular weight of from approx. 5000 to 11 000. Commercially available examples of this compound class are, for example, the Tetronic® brands from BASF and the ®Genapol PN brands of Clariant GmbH.

Semipolar Nonionic Surfactants

This category of nonionic compounds comprises water-soluble amine oxides, water-soluble phosphine oxides and water-soluble sulfoxides, each having an alkyl radical of from approx. 10 to approx. 18 carbon atoms. Semipolar nonionic surfactants are also amine oxides of the formula

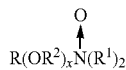

where R is an alkyl, hydroxyalkyl or alkylphenol group with a chain length of from approx. 8 to approx. 22 carbon atoms. $R^2$ is an alkylene or hydroxyalkylene group having from approx. 2 to 3 carbon atoms or mixtures thereof, each radical $R^1$ is an alkyl or hydroxyalkyl group having from approx. 1 to approx. 3 carbon atoms or a polyethylene oxide group having about 1 to about 3 ethylene oxide units, and x is a number from 0 to about 10. The $R^1$ groups may be joined together via an oxygen or nitrogen atom and thus form a ring. Amine oxides of this type are particularly $C_{10}$-$C_{18}$-alkyldimethylamine oxides and $C_8$-$C_{12}$-alkoxyethyldihydroxy-ethylamine oxides.

Fatty Acid Amides

Fatty acid amides have the formula

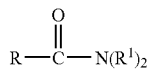

in which R is an alkyl group having from approx. 7 to approx. 21, preferably from approx. 9 to approx. 17, carbon atoms, and $R^1$ is in each case independently hydrogen, $C_1$-$C_4$-alkyl, $C_1$-$C_4$-hydroxyalkyl or $(C_2H_4O)_xH$ where x varies from about 1 to about 3. Preference is given to $C_8$-$C_{20}$ amides, monoethanolamides, diethanolamides and isopropanolamides.

Further suitable nonionic surfactants are alkyl- and alkenyloligoglycosides, and also fatty acid polyglycol esters or fatty amine polyglycol esters each having from 8 to 20, preferably from 12 to 18, carbon atoms in the fatty alkyl radical, alkoxylated triglycamides, mixed ethers or mixed formyls, alkyloligoglycosides, alkenyloligoglycosides, fatty acid N-alkylglucamides, phosphine oxides, dialkyl sulfoxides and protein hydrolyzates.

Polyethylene oxide, polypropylene oxide and polybutylene oxide condensates of alkylphenols.

These compounds include the condensation products of alkylphenols having a $C_6$-$C_{20}$-alkyl group, which may be linear or branched, with alkene oxides. Preference is given to compounds having from approx. 5 to 25 mol of alkene oxide per mole of alkylphenol. Commercially available surfactants of this type are, for example, Igepal® CO-630, Triton® X-45, X-114, X-100 and X102, and the ®Arkopal-N brands of Clariant GmbH. These surfactants are referred to as alkylphenol alkoxylates, for example alkylphenol ethoxylates.

Zwitterionic Surfactants

Typical examples of amphoteric or zwitterionic surfactants are alkylbetaines, alkylamidobetaines, aminopropionates, aminoglycinates or amphoteric imidazolinium compounds of the formula

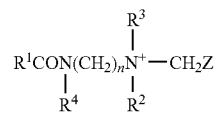

in which $R^1$ is $C_8$-$C_{22}$-alkyl or -alkenyl, $R^2$ is hydrogen or $CH_2CO_2M$, $R^3$ is $CH_2CH_2OH$ or $CH_2CH_2OCH_2CH_2CO_2M$, $R^4$ is hydrogen, $CH_2CH_2OH$ or $CH_2CH_2COOM$, Z is $CO_2M$ or $CH_2CO_2M$, n is 2 or 3, preferably 2, M is hydrogen or a cation such as an alkali metal, alkaline earth metal, ammonium or alkanolammonium cation.

Preferred amphoteric surfactants of this formula are monocarboxylates and dicarboxylates. Examples thereof are cocoamphocarboxypropionate, cocoamidocarboxypropionic acid, cocoamphocarboxyglycinate (also referred to as cocoamphodiacetate) and cocoamphoacetate.

Further preferred amphoteric surfactants are alkyldimethylbetaines (®Genagen LAB/Clariant GmbH) and alkyldipolyethoxybetaines with an alkyl radical having from approx. 8 to approx. 22 carbon atoms which may be linear or branched, preferably having from 8 to 18 carbon atoms and more preferably having from approx. 12 to approx. 18 carbon atoms.

Suitable cationic surfactants are substituted or unsubstituted, straight-chain or branched, quaternary ammonium salts of the $R^1N(CH_3)_3^+X^-$, $R^1R^2N(CH_3)_2^+X^-$, $R^1R^2R^3N(CH_3)^+X^-$ or $R^1R^2R^3R^4N^+X^-$ type. The $R^1$, $R^2$, $R^3$ and $R^4$ radicals are each independently preferably unsubstituted alkyl having a chain length of from 8 to 24 carbon atoms, in particular from 10 to 18 carbon atoms, hydroxyalkyl having from approx. 1 to approx. 4 carbon atoms, phenyl, $C_2$-$C_{18}$-alkenyl, $C_7$-$C_{24}$-aralkyl, $(C_2H_4O)_xH$ where x is an integer from 1 to 3, alkyl radicals comprising one or more ester groups, or cyclic quaternary ammonium salts. X is a suitable anion.

Further washing composition ingredients which may be present in the present invention include inorganic and/or organic builders in order to reduce the hardness of the water.

These builders may be present in the washing and cleaning compositions in proportions by weight of from about 5% to about 80%.

Inorganic builders include, for example, alkali metal, ammonium and alkanolammonium salts of polyphosphates, for instance tripolyphosphates, pyrophosphates and glasslike polymeric metaphosphates, phosphonates, silicates, carbonates including bicarbonates and sesquicarbonates, sulfates and aluminosilicates.

Examples of silicate builders are the alkali metal silicates, especially those having an $SiO_2$:$Na_2O$ ratio between 1.6:1 and 3.2:1, and also sheet silicates, for example sodium sheet silicates, as described in U.S. Pat. No. 4,664,839, obtainable from Clariant GmbH under the SKS® brand. SKS-6® is a particularly preferred sheet silicate builder.

Aluminosilicate builders are particularly preferred for the present invention. They are particularly zeolites having the formula $Na_z[(AlO_2)_z(SiO_2)_y]\cdot xH_2O$ where z and y are integers of at least 6, the ratio of z to y is from 1.0 to about 0.5, and x is an integer from about 15 to about 264.

Suitable ion exchangers based on aluminosilicate are commercially available. These aluminosilicates may be of crystalline or amorphous structure, and may be naturally occurring or else synthetically produced. The processes for the production of ion exchangers based on aluminosilicate are described in U.S. Pat. Nos. 3,985,669 and 4,605,509. Preferred ion exchangers based on synthetic crystalline aluminosilicates are obtainable under the name Zeolite A, Zeolite P(B) (including those disclosed in EP-A-0 384 070) and Zeolite X. Preference is given to aluminosilicates having a particle diameter between 0.1 and 10 μm.

Suitable organic builders (cobuilders) include polycarboxyl compounds, for example ether polycarboxylates and oxydisuccinates, as described, for example, in U.S. Pat. Nos. 3,128,287 and 3,635,830. Reference should likewise be made to "TMS/TDS" builders from U.S. Pat. No. 4,663,071.

Other suitable builders include the ether hydroxypolycarboxylates, copolymers of maleic anhydride with ethylene or vinyl methyl ether, 1,3,5-trihydroxybenzene-2,4,6-trisulfonic acid and carboxymethyloxysuccinic acid, the alkali metal, ammonium and substituted ammonium salts of polyacetic acids, for example ethylenediaminetetraacetic acid and nitrilotriacetic acid, and also polycarboxylic acids such as mellitic acid, succinic acid, oxydisuccinic acid, polymaleic acid, benzene-1,3,5-tricarboxylic acid, carboxymethyloxysuccinic acid, and soluble salts thereof.

Important organic builders are also polycarboxylates based on acrylic acid and maleic acid, for example the Sokalan CP brands of BASF.

Builders based on citrate, for example citric acid and its soluble salts, especially the sodium salt, are preferred polycarboxylic acid builders, which may also be used in granulated formulations, especially together with zeolites and/or sheet silicates.

Further suitable builders are the 3,3-dicarboxy-4-oxa-1,6-hexanedioates and the related compounds which are disclosed in U.S. Pat. No. 4,566,984.

When builders based on phosphorus are used, and especially when bars of soap for handwashing are to be formulated, various alkali metal phosphates, for instance sodium tripolyphosphate, sodium pyrophosphate and sodium orthophosphate, may be used. It is likewise possible to use phosphonate builders such as ethane-1-hydroxy-1,1-diphosphonate and other known phosphonates, as disclosed, for example, in U.S. Pat. Nos. 3,159,581, 3,213,030, 3,422,021, 3,400,148 and 3,422,137.

The washing and cleaning compositions which comprise the inventive highly concentrated, aqueous oligo or polyester formulations may also comprise the customary assistants which enhance the cleaning action, serve for the care of the textile to be washed or alter the use properties of the washing composition.

Suitable assistants include the substances mentioned in U.S. Pat. No. 3,936,537, for example enzymes, especially proteases, lipases, cellulases and amylases, mannanases, glycosidases, enzyme stabilizers, foam enhancers, foam inhibitors, tarnish and/or corrosion inhibitors, suspension media, dyes, dye transfer inhibitors, fillers, optical brighteners, disinfectants, alkalis, hydrotropic compounds, antioxidants, perfumes, solvents, solubilizers, redeposition inhibitors, dispersants, processing assistants, softeners and antistats.

The washing compositions of the present invention may optionally comprise one or more conventional bleaches, and also bleach activators, bleach catalysts and suitable stabilizers. In general, it must be ensured that the bleaches used are compatible with the cleaning composition ingredients. Conventional test methods, for instance the determination of the bleaching activity of the ready-formulated cleaning composition as a function of the storage time, may be used for this purpose.

Peroxy acids may be used either as the free peroxy acid, or it is possible to use a combination of an inorganic per salt, for example sodium perborate or sodium percarbonate, and an organic peroxy acid precursor.

The organic peroxy acid precursors are often referred to in the prior art as bleach activators.

Examples of suitable organic peroxy acids are disclosed in U.S. Pat. Nos. 4,374,035, 4,681,592, 4,634,551, 4,686,063, 4,606,838 and 4,671,891.

The examples of compositions which are suitable for bleaching laundry and which comprise perborate bleaches and activators are described in U.S. Pat. Nos. 4,412,934, 4,536,314, 4,681,695 and 4,539,130.

Examples of peroxy acids which are preferred for use in this invention include peroxydodecanedioic acid (DPDA), the nonyl amide of peroxysuccinic acid (NAPSA), the nonyl amide of peroxyadipic acid (NAPAA) and decyldiperoxysuccinic acid (DDPSA), nonanoylamidocaproyloxybenzenesulfonic acid and alkanoyloxybenzenesulfonic acids such as nonanoyloxybenzenesulfonic acid (NOBS) and lauryloxybenzenesulfonic acid (LOBS).

In the inventive washing compositions and laundry treatment compositions, particular preference is given to using bleach systems based on a per salt such as perborates or percarbonates with the bleach activator tetraacetylethylenediamine (TAED).

In addition, the inventive formulations may also be used in cosmetic formulations such as skin cleaning compositions, for example in shower gels, shampoos, soaps, and in skincare compositions. Skincare compositions are, for example, day creams, night creams, care creams, nutrient creams, body lotions and ointments.

A further field of use of the inventive formulations is the treatment (for example the finishing) of synthetic fibers, especially polyester fibers, or fabrics which comprise synthetic fibers, especially polyester fibers, in the textile industry.

EXAMPLES

1. A 70% aqueous formulation of the polyester TexCare SRN-100 was prepared with addition of 0.5% by weight (Al) Sokalan CP 12 S acrylic acid-maleic acid copolymer. To this end, the polyester was melted and water and the copolymer were stirred into the melt. The temperature of the melt and of the water were varied. The mixtures were stirred at the mixing temperature resulting in each case for 15 minutes and then cooled to room temperature with stirring.

To investigate the thermal storage stability, the polyester formulations were stored at 40° C. and assessed visually after 8 weeks.

For comparative purposes, the polyester formulation without addition of Sokalan CP 12 S was prepared and assessed.

TABLE 1

Stability of an aqueous polyester formulation with addition of 0.5% by weight of (active ingredient) Sokalan CP 12 S. Comparative examples without Sokalan CP 12 S.

| Polyester formulation | Melt T (° C.) | Water T (° C.) | Visual assessment after preparation | after 8 weeks |
|---|---|---|---|---|
| A) without additive | 80 | 20 | clear, homogeneous | sedimentation |
| A) with Sokalan CP 12S | 80 | 20 | clear, homogeneous | clear, homogeneous |
| B) without additive | 60 | 20 | clear, homogeneous | sedimentation |
| B) with Sokalan CP 12S | 60 | 20 | clear, homogeneous | clear, homogeneous |
| C) without additive | 45 | 30 | clear, homogeneous | sedimentation |
| C) with Sokalan CP 12S | 45 | 30 | clear, homogeneous | clear, homogeneous |
| D) without additive | 40 | 75 | clear, homogeneous | sedimentation |
| D) with Sokalan CP 12S | 40 | 75 | clear, homogeneous | clear, homogeneous |

2. A 70% aqueous formulation of the polyester TexCare SRN-100 was prepared with addition of 0.5% by weight (AI) Sokalan PA 20 PN polyacrylic acid. To this end, the polyester was melted and water and polyacrylic acid were stirred into the melt. The temperature of the melt and of the water were varied.

The mixtures were stirred at the mixing temperature resulting in each case for 15 minutes and then cooled to room temperature with stirring.

To investigate the thermal storage stability, the polyester formulations were stored at 40° C. and assessed visually after 8 weeks.

For comparative purposes, the polyester formulation without addition of Sokalan PA 20 PN was prepared and assessed.

TABLE 2

Stability of an aqueous polyester formulation with addition of 0.5% by weight of (active ingredient) Sokalan PA 20 PN. Comparative examples without Sokalan PA 20 PN.

| Polyester formulation | Melt T (° C.) | Water T (° C.) | Visual assessment after preparation | after 8 weeks |
|---|---|---|---|---|
| A) without additive | 80 | 20 | clear, homogeneous | sedimentation |
| A) with Sokalan PA 20 PN | 80 | 20 | clear, homogeneous | clear, homogeneous |
| B) without additive | 60 | 20 | clear, homogeneous | sedimentation |
| B) with Sokalan PA 20 PN | 60 | 20 | clear, homogeneous | clear, homogeneous |
| C) without additive | 45 | 30 | clear, homogeneous | sedimentation |
| C) with Sokalan PA 20 PN | 45 | 30 | clear, homogeneous | clear, homogeneous |
| D) without additive | 40 | 75 | clear, homogeneous | sedimentation |
| D) with Sokalan PA 20 PN | 40 | 75 | clear, homogeneous | clear, homogeneous |

3. A 70% aqueous formulation of the polyester TexCare SRN-100 was prepared with addition of 0.5% by weight of (AI) of the maleic acid copolymer Sokalan PM 10 I. To this end, the polyester was melted and water and the maleic acid copolymer were stirred into the melt. The temperature of the melt was 45° C. and that of the water 30° C. The mixture was stirred for 1 hour and then cooled with stirring to room temperature.

To investigate the thermal storage stability, the polyester formulation was stored at 40° C. and assessed visually after 8 weeks.

For comparative purposes, the polyester formulation was prepared and assessed without addition of Sokalan PM 10 I.

TABLE 3

Stability of an aqueous polyester formulation with addition of 0.5% by weight of (active ingredient) Sokalan PM 10 I. Comparative examples without Sokalan PM 10 I.

| Polyester formulation | Melt T (° C.) | Water T (° C.) | Visual assessment after preparation | after 8 weeks |
|---|---|---|---|---|
| A) without additive | 45 | 30 | clear, homogeneous | sedimentation |
| A) with Sokalan PM 10 I | 45 | 30 | clear, homogeneous | clear, homogeneous |

4. A 70% aqueous formulation of the polyester TexCare SRN-100 was prepared with addition of 0.5% by weight of (AI) of the polycarboxylate Sokalan PM 70. To this end, the polyester was melted and water and the polycarboxylate were stirred into the melt. The temperature of the melt was 45° C. and that of the water 30° C. The mixture was stirred for 1 hour and then cooled with stirring to room temperature.

To investigate the thermal storage stability, the polyester formulation was stored at 40° C. and assessed visually after 8 weeks.

For comparative purposes, the polyester formulation was prepared and assessed without addition of Sokalan PM 70.

TABLE 4

Stability of an aqueous polyester formulation with addition of 0.5% by weight of (active ingredient) Sokalan PM 70. Comparative examples without Sokalan PM 70.

| Polyester formulation | Melt T (° C.) | Water T (° C.) | Visual assessment after preparation | after 8 weeks |
|---|---|---|---|---|
| A) without additive | 45 | 30 | clear, homogeneous | sedimentation |
| A) with Sokalan PM 70 | 45 | 30 | clear, homogeneous | clear, homogeneous |

5. An 80% aqueous formulation of the polyester TexCare SRN-100 was prepared with addition of 0.5% by weight of (AI) Sokalan CP 12 S acrylic acid-maleic acid copolymer. To this end, the polyester was melted and water and the copolymer were stirred into the melt. The temperature of the melt was 60° C. and that of the water 20° C. The mixture was stirred for 1 hour and then cooled to room temperature with stirring.

To investigate the thermal storage stability, the polyester formulation was stored at 40° C. and assessed visually after 8 weeks.

For comparative purposes, the polyester formulation was prepared and assessed without addition of Sokalan CP 12 S.

TABLE 5

Stability of an aqueous polyester formulation with addition of 0.5% by weight of (active ingredient) Sokalan CP 12 S. Comparative examples without Sokalan CP 12 S.

| Polyester formulation | Melt T (° C.) | Water T (° C.) | Visual assessment after preparation | after 8 weeks |
|---|---|---|---|---|
| A) without additive | 60 | 20 | clear, homogeneous | sedimentation |
| A) with Sokalan CP 12 S | 60 | 20 | clear, homogeneous | clear, homogeneous |

6. A 33% aqueous formulation of the polyester TexCare SRN-100 was prepared with addition of 33% by weight of (A1) Sokalan CP 12 S acrylic acid-maleic acid copolymer. To this end, the polyester was melted and the copolymer was stirred tel quel into the melt. The temperature of the melt was 60° C. The mixture was stirred at the resulting mixing temperature for 15 minutes and then cooled to room temperature with stirring.

To investigate the thermal storage stability, the polyester formulation was stored at 40° C. and assessed visually after 8 weeks.

For comparative purposes, the polyester formulation was prepared and assessed without addition of Sokalan CP 12 S.

TABLE 6

Stability of an aqueous polyester formulation with addition of 33% by weight of (active ingredient) Sokalan CP 12 S. Comparative examples without Sokalan CP 12 S.

| Polyester formulation | Melt T (° C.) | Sokalan CP 12 S T (° C.) | Visual assessment after preparation | after 8 weeks |
|---|---|---|---|---|
| A) without additive | 60 | 20 | clear, homogeneous | sedimentation |
| A) with Sokalan CP 12S | 60 | 20 | clear, homogeneous | clear, homogeneous |

7. A 50% aqueous formulation of the polyester TexCare SRN-100 was prepared with addition of 25% by weight of (A1) Sokalan CP 12 S acrylic acid-maleic acid copolymer. To this end, the polyester was melted and the copolymer was stirred tel quel into the melt. The temperature of the melt was 60° C. The mixture was stirred at the resulting mixing temperature for 15 minutes and then cooled to room temperature with stirring.

To investigate the thermal storage stability, the polyester formulation was stored at 40° C. and assessed visually after 8 weeks.

For comparative purposes, the polyester formulation was prepared and assessed without addition of Sokalan CP 12 S.

TABLE 7

Stability of an aqueous polyester formulation with addition of 25% by weight of (active ingredient) Sokalan CP 12 S. Comparative examples without Sokalan CP 12 S.

| Polyester formulation | Melt T (° C.) | Sokalan CP 12 S T (° C.) | Visual assessment after preparation | after 8 weeks |
|---|---|---|---|---|
| A) with additive | 60 | 20 | clear, homogeneous | sedimentation |
| A) with Sokalan CP 12S | 60 | 20 | clear, homogeneous | clear, homogeneous |

Index of the Trade Names Used:

| | | |
|---|---|---|
| TexCare ® SRN-100 | (Clariant) | Nonionic soil release polyester, 100% strength |
| Sokalan ® CP 12 S | (BASF) | Acrylic acid-maleic acid copolymer, MM = 3000 g/mol, 50% strength |
| Sokalan PA 20 PN | (BASF) | Partly neutralized polyacrylic acid, MM = 2500 g/mol, 54% strength |
| Sokalan PM 10 I | (BASF) | Copolymer based on maleic acid, sodium salt, MM = 4000 g/mol, 44% strength |
| Sokalan PM 70 | (BASF) | Polycarboxylate, MM = 20 000 g/mol, 40% strength |

The invention claimed is:

1. A highly concentrated aqueous formulation of oligo- and polyester, consisting essentially of 30 to 90% by weight of an oligo- and polyester and from 0.1 to 40% by weight of a polycarboxylic acid or polycarboxylate, wherein the oligo- and polyester has been end group-capped by alkylpolyalkylene glycols.

2. The formulation as claimed in claim 1, wherein the oligo- and polyester is a water-soluble or water-dispersible polyester.

3. The formulation as claimed in claim 1, wherein the oligo- and polyester is a water-soluble or water-dispersible polyester having a molar mass of less than 20 000.

4. The formulation as claimed in claim 1, wherein the oligo- and polyester is a water-soluble or water-dispersible polyester which has been end group-capped by methylpolyethylene glycols, the number of ethylene glycol units being $\leq$90.

5. The formulation as claimed in claim 1, wherein the oligo- and polyester is a water-soluble or water-dispersible polyester which has $\leq$60% by mass of esterified terephthalic acid units.

6. The formulation as claimed in claim 1, wherein the oligo- and polyester is a water-soluble or water-dispersible polyester which contains ethylene glycol or polyethylene glycol units.

7. The formulation as claimed in claim 1, wherein the oligo- and polyester is a water-soluble or water-dispersible polyester which contains propylene glycol or polypropylene glycol units.

8. The formulation as claimed in claim 1, wherein the oligo- and polyester is a water-soluble or water-dispersible polyester which contains both ethylene glycol or polyethylene glycol units and propylene glycol or polypropylene glycol units.

9. The formulation as claimed in claim 1, wherein the oligo- and polyester is a water-soluble or water-dispersible polyester which has been modified anionically by means of copolymerized sulfoisophthalic acid or glyceryl sulfoethyl ether units or glyceryl sulfopropyl ether units, and mixtures thereof.

10. The formulation as claimed in claim 1, wherein the polycarboxylic acid or the polycarboxylate is a compound of the formula

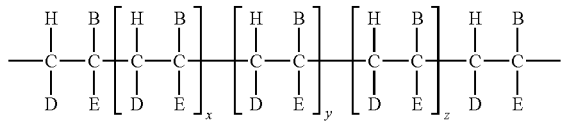

in which B is hydrogen, $C_1$-$C_4$-alkyl, —COOM, —$CH_2$—COOM,

D is hydrogen, $C_1$-$C_4$-alkyl, —COOM,

E is hydrogen, $C_1$-$C_4$-alkyl, cycloalkyl, aryl, —COOM, —$CH_2$—COOM, $C_1$-$C_4$-acyl, —OH, $C_1$-$C_4$-alkoxy, halogen, or —CN, x is from 0 to 3500, y is from 0 to 3500, z is from 0 to 3500, M is hydrogen, sodium, potassium, lithium, ammonium or substituted ammonium, where at least one index x, y or z is greater than zero.

11. The formulation as claimed in claim 1, wherein the polycarboxylic acid or the polycarboxylate is polyacrylic acid or polymaleic acid and is present in free, partly neutralized or fully neutralized form.

12. The formulation as claimed in claim 1, wherein the polycarboxylic acid or the polycarboxylate is a copolymer selected from the group consisting of acrylic acid and maleic acid, maleic acid and olefin, maleic acid and vinyl methyl ether, acrylic acid and olefin, and acrylic acid and vinyl methyl ether, wherein the copolymer is present in free, partly neutralized or fully neutralized form.

13. The formulation as claimed in claim 1, wherein the polycarboxylic acid or the polycarboxylate is a compound of the formula

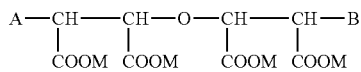

in which A is H or —OH,

B is H or a group of the formula

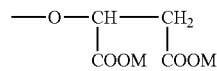

M is H, Li, Na, K, ammonium or substituted ammonium.

14. The formulation as claimed in claim 1, wherein the polycarboxylic acid or the polycarboxylate is a compound of the formula

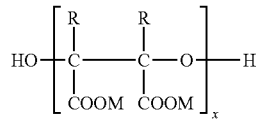

in which M is H, Li, Na, K, ammonium, substituted ammonium, x is from 2 to 15 and R is hydrogen or $C_1$-$C_4$-alkyl.

15. The formulation as claimed in claim 1, containing from 50 to 90% by weight of oligo- and polyester.

16. A washing and cleaning composition comprising the formulation as claimed in claim 1.

17. A cosmetic formulation comprising the formulation as claimed in claim 1.

18. A textile assistant for treating synthetic fiber or textile fabric comprising synthetic fiber, said textile assistant comprising the formulation as claimed in claim 1.

19. The formulation as claimed in claim 1, wherein the oligo- and polyester is a water-soluble or water-dispersible polyester having a molar mass of less than 10 000.

20. The formulation as claimed in claim 1, wherein the oligo- and polyester is a water-soluble or water-dispersible polyester having a molar mass of less than 5000.

21. The formulation as claimed in claim 1, wherein the oligo- and polyester is a water-soluble or water-dispersible polyester which has been end group-capped by methylpolyethylene glycols, the number of ethylene glycol units being $</=50$.

22. The formulation as claimed in claim 1, wherein the oligo- and polyester is a water-soluble or water-dispersible polyester which has been end group-capped by methylpolyethylene glycols, the number of ethylene glycol units being $</=20$.

23. The formulation as claimed in claim 1, wherein the oligo- and polyester is a water-soluble or water-dispersible polyester which has $</=50\%$ by mass of esterified terephthalic acid units.

24. The formulation of claim 10, wherein B is methyl, ethyl, or propyl.

25. The formulation of claim 10, wherein D is methyl.

26. The formulation of claim 10, wherein E is selected from the group consisting of methyl, ethyl; cyclohexyl; phenyl, —COOM, —$CH_2$—COOM, acetyl; —OH, —$OCH_3$; chlorine, and —CN.

27. The formulation of claim 12, wherein the olefin is ethylene.

28. The textile assistant of claim 18, wherein the synthetic fiber is a polyester fiber.

* * * * *